(12) United States Patent
Williams

(10) Patent No.: US 7,231,495 B2
(45) Date of Patent: Jun. 12, 2007

(54) SPECULATIVE DATA STREAMING DISK DRIVE AND SYSTEM

(75) Inventor: Larry Lynn Williams, Los Altos, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 678 days.

(21) Appl. No.: 10/651,478

(22) Filed: Aug. 29, 2003

(65) Prior Publication Data

US 2005/0047242 A1   Mar. 3, 2005

(51) Int. Cl.
*G06F 12/00* (2006.01)

(52) U.S. Cl. .................... 711/137; 711/113
(58) Field of Classification Search ............... None
See application file for complete search history.

(56) References Cited

U.S. PATENT DOCUMENTS

| | | | |
|---|---|---|---|
| 5,765,213 A * | 6/1998 | Ofer ........................ | 711/213 |
| 6,418,510 B1 * | 7/2002 | Lamberts .................. | 711/113 |
| 6,557,079 B1 * | 4/2003 | Mason et al. .............. | 711/137 |
| 6,891,740 B2 * | 5/2005 | Williams ................... | 365/49 |
| 7,000,077 B2 * | 2/2006 | Grimsrud et al. .......... | 711/137 |
| 2002/0178326 A1 * | 11/2002 | Ohta et al. ................ | 711/113 |
| 2004/0260909 A1 * | 12/2004 | Lee et al. .................. | 711/213 |

\* cited by examiner

*Primary Examiner*—Denise Tran
(74) *Attorney, Agent, or Firm*—Lewis L. Nunnelley; Dillon & Yudell LLP

(57) ABSTRACT

A disk drive capable of supporting speculative data transfers. Requested first data are read from the disk drive. Before the first data are read, a determination is made as to whether there are un-requested second data that are likely to be requested at a later time as part of a data stream. If so, then a determination is made as to whether the second data and the first data are stored in locations that are physically/logically proximate on the same disk. If the second data are close to the first data, then the second data are speculatively read and stored in a local disk cache. If a subsequent request comes to the disk drive for the second data, then the second data are quickly produced from the disk cache rather than being slowly read off the disk.

18 Claims, 5 Drawing Sheets

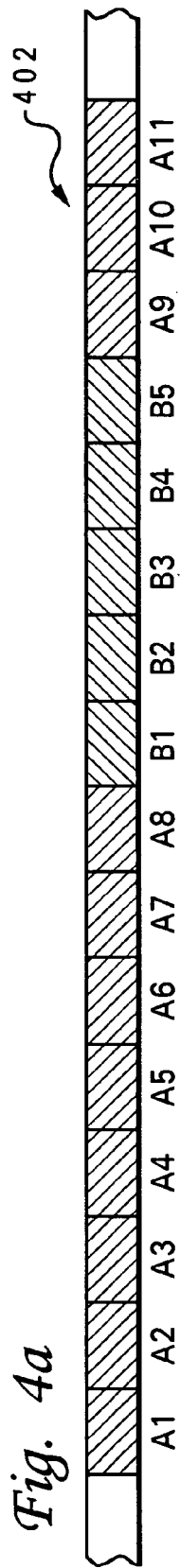
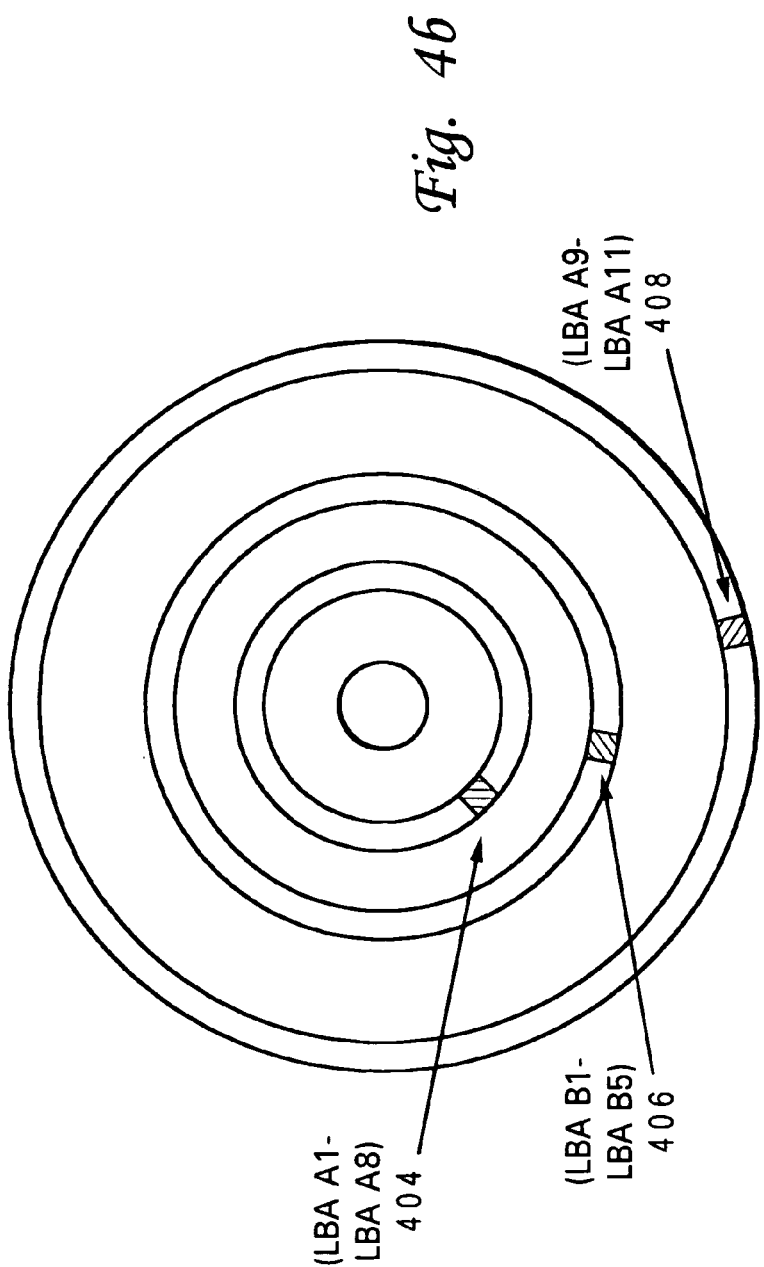

SPECULATIVE DATA STREAMING DISK DRIVE AND SYSTEM

BACKGROUND OF THE INVENTION

1. Technical Field

The present invention relates in general to digital data storage, and in particular to speculative data reads. Still more particularly, the present invention relates to a system having a disk drive that performs speculatively reads of data depending on a position of a read/write head in the disk drive and a nature of earlier requested data.

2. Description of the Related Art

Digital computers perform two main internal functions. They store software (i.e., instructions and data are stored in registers, buffers, caches, primary and secondary memory) and they manipulate that software (i.e., the computer performs arithmetic operations, heuristic operations, data conversion and other processes in an appropriate execution unit such as an adder, shifter, etc.). While much of the processing speed of a computer is based on central processor and internal bus speeds, a major factor limiting the speed of the computer is the length of time it takes to supply instructions and data to an execution unit. This length of time is in part a function of the hierarchical position and physical speed of a memory containing the required instructions/data.

The hierarchical position of a memory refers to how logically close the memory is to the execution unit. Data/instructions cannot skip over hierarchical levels, but must pass from one level through the next until they reach the execution unit.

The physical speed of the memory is a function of the memory's physical structure. Memory in a semiconductor is limited by circuit speeds, while the speed of memory in secondary memory is primarily limited by a mechanical movement of a disk and/or read/write head.

A typical memory hierarchy is depicted in FIG. 1. Memory that is higher in the memory hierarchy (closer to the central processing unit—CPU) tends to be faster, more expensive and of a smaller capacity, while memory lower in the memory hierarchy tends to be slower, cheaper and of a larger capacity. For example, in a computer 100, a CPU 102 includes a processor core 104, which typically has an on-board Level-one (L1) cache 108. L1 Cache 108 is typically made up of very fast Static Random Access Memory (SRAM). (Processor core 104 also has on-board queues 106, which are extremely fast registers/latches the pass instructions/data to execution units in the processor core 104. However, although queues, registers and latches briefly store instructions and data, they typically are not associated with a memory hierarchy.)

Also in the CPU 102, but typically not within the processor core 104, is a Level-two (L2) cache 110. Off-board the CPU 102 is a Level-three (L3) cache 112. L2 cache 110 and L3 cache 112, like L1 cache 108, are typically SRAM's. L3 cache 112 is connected, via a system bus 111, to a system memory 113, which is typically a Dynamic Random Access Memory (DRAM), which is slower than SRAM. System memory 113 is connected, via an input/output (I/O) bus 124, to a secondary memory 116, which may be a floppy disk drive, a Compact Disk-Read Only Memory (CD-ROM) drive, a Digital Video Disk (DVD) drive, Zip drive, or a hard disk drive storage device.

Secondary memory is much slower than other memories in the memory hierarchy. This is due primarily to the fact that secondary memory has a mechanical component that the other memories do not. That is, while other memories are essentially limited by how long it take transistors that make up the memories to turn off and on, secondary memory requires physical movement of a read-write head, optical sensor, or other mechanical device to read data off the rotating storage medium (hard disk, CD-ROM, floppy, DVD, etc.)

Typically, data is retrieved from a secondary storage device in units that represent a logical group of data. For example, data is retrieved from a disk drive by first specifying the logical block address (LBA) of the first block of data, and the number of blocks in the record. Information is then streamed from the disk drive to the disk controller until the last logical block is sent. The disk drive then waits for another read command with its LBA and the number of blocks to be transferred. Such a method and system limits the speed of data transfer primarily by the mechanical characteristics of the storage device. Thus, in a disk drive, significant time is lost while the drive is waiting for the next required LBA.

Therefore, there is a need for a disk drive that avoids "down time" waiting for a next data transfer command.

SUMMARY OF THE INVENTION

In view of the foregoing, the present invention provides a disk drive capable of supporting speculative data transfers. Requested first data are read from the disk drive. Before the first data are read, a determination is made as to whether there are un-requested second data that are likely to be requested at a later time as part of a data stream. If so, then a determination is made as to whether the second data and the first data are stored in locations that are physically/logically proximate on the same disk. If the second data are close to the first data, then the second data are speculatively read and stored in a local disk cache. If a subsequent request comes to the disk drive for the second data, then the second data are quickly produced from the disk cache rather than being slowly read off the disk.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 4a depicts a section of a track of a disk surface storing interleaving segments of data from different read requests;

FIG. 4b illustrates a disk surface on which different data segments from different data read requests are located on different disk tracks.

DETAILED DESCRIPTION OF A PREFERRED EMBODIMENT

Figure 1:
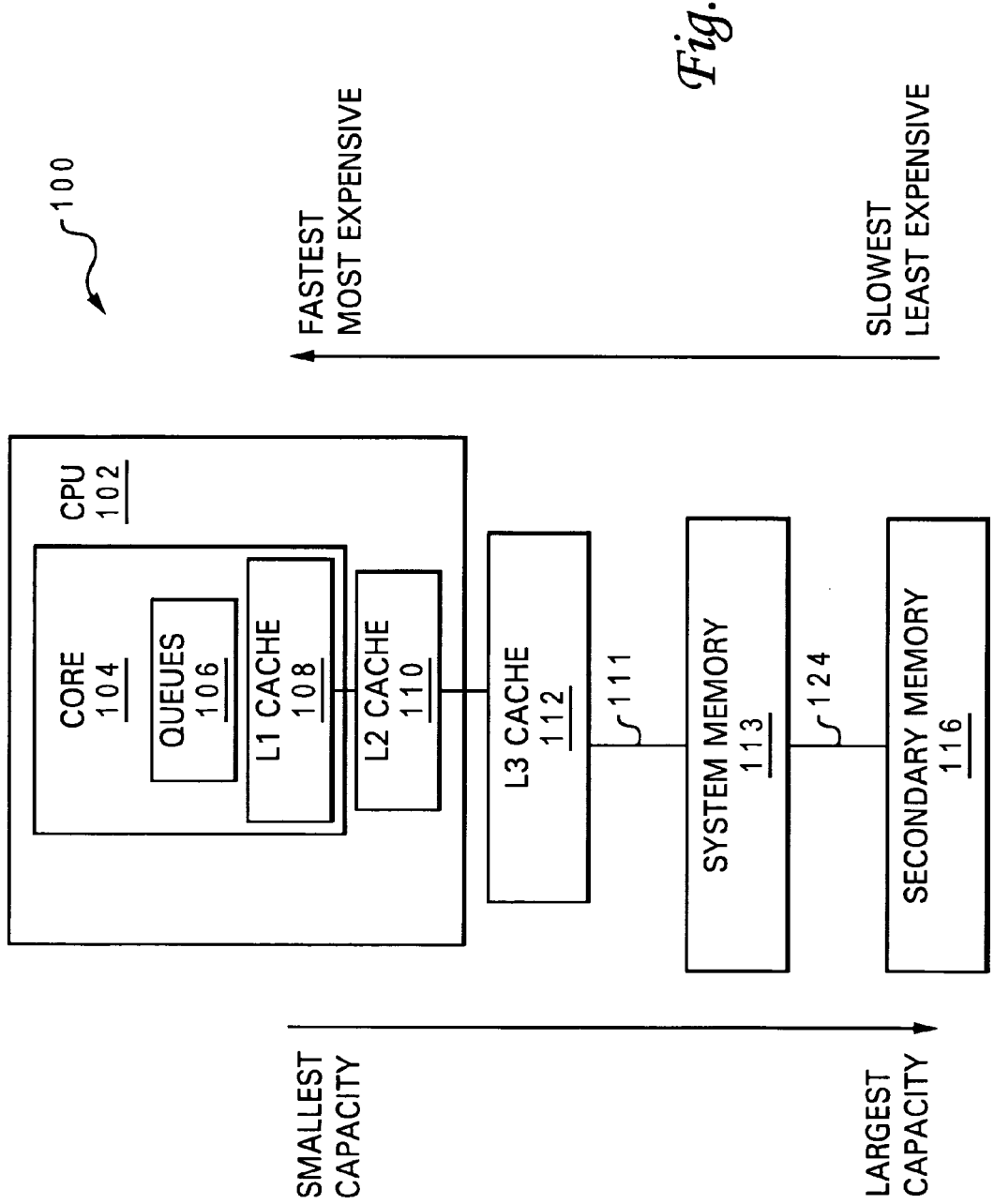
FIG. 1 depicts a typical prior art memory hierarchy.
Figure 2:
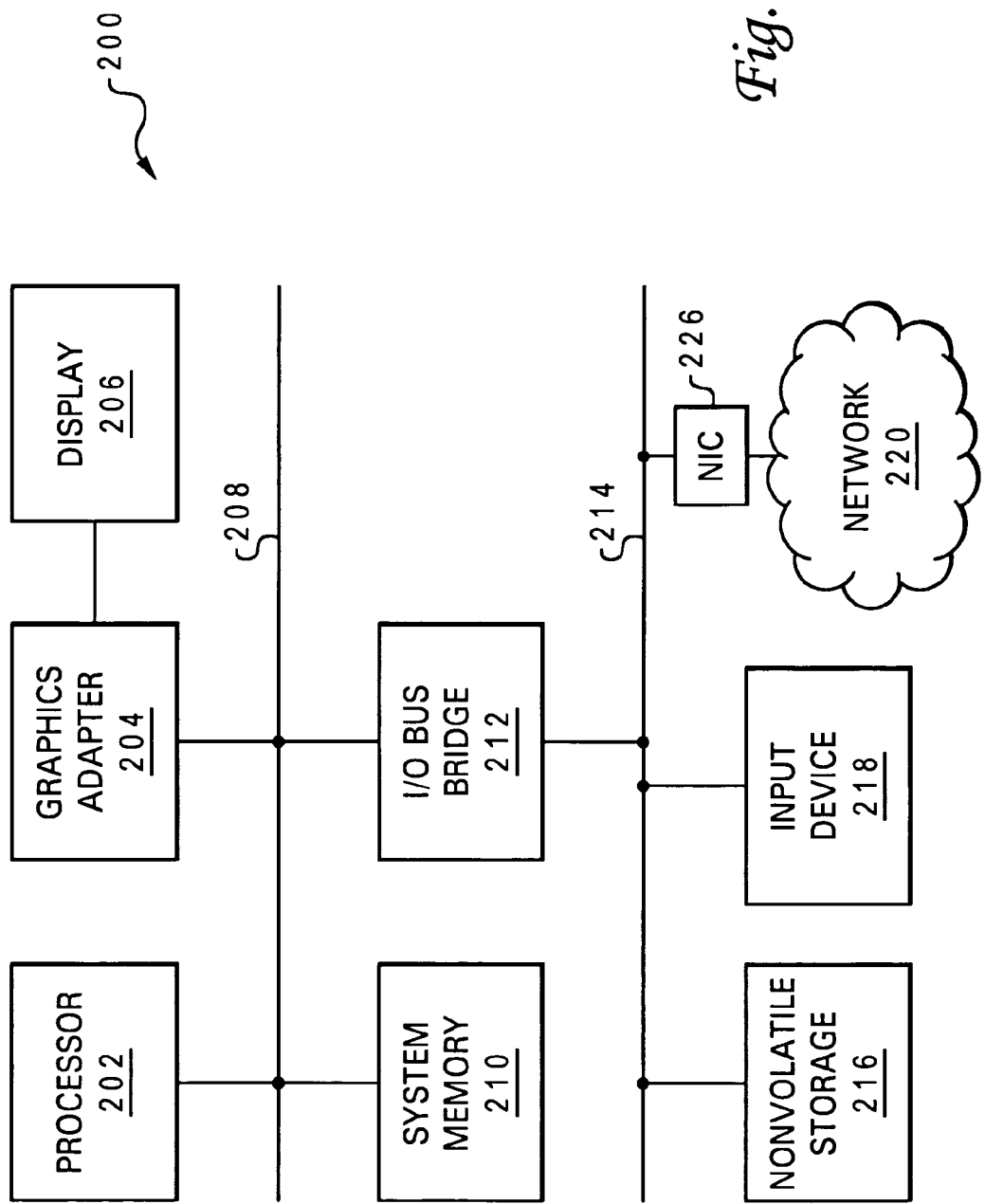
FIG. 2 illustrates an exemplary data processing system used in the present invention.

With reference now to FIG. 2, data processing system 200 depicts an exemplary data processing system used in the present invention, which includes a central processing unit (CPU) 202, which is connected to a system bus 208. In the exemplary embodiment, data processing system 200 includes a graphics adapter 204 also connected to system bus 208, for providing user interface information to a display 206.

Also connected to system bus 208 are a system memory 210 and an input/output (I/O) bus bridge 212. I/O bus bridge 212 couples an I/O bus 214 to system bus 208, relaying and/or transforming data transactions from one bus to the other. Peripheral devices such as nonvolatile storage 216, which may be a hard disk drive, and input device 218, which may include a conventional mouse, a trackball, or the like, is connected to I/O bus 214. Also connected to I/O bus 214 is a network interface card (NIC) 226, which enables network communication between data processing system 200 and a network 220.

The exemplary embodiment shown in FIG. 2 is provided solely for the purposes of explaining the invention and those skilled in the art will recognize that numerous variations are possible, both in form and function. For instance, data processing system 200 might also include a compact disk read-only memory (CD-ROM) or digital video disk (DVD) drive, a sound card and audio speakers, and numerous other optional components. All such variations are believed to be within the spirit and scope of the present invention.

Figure 3:
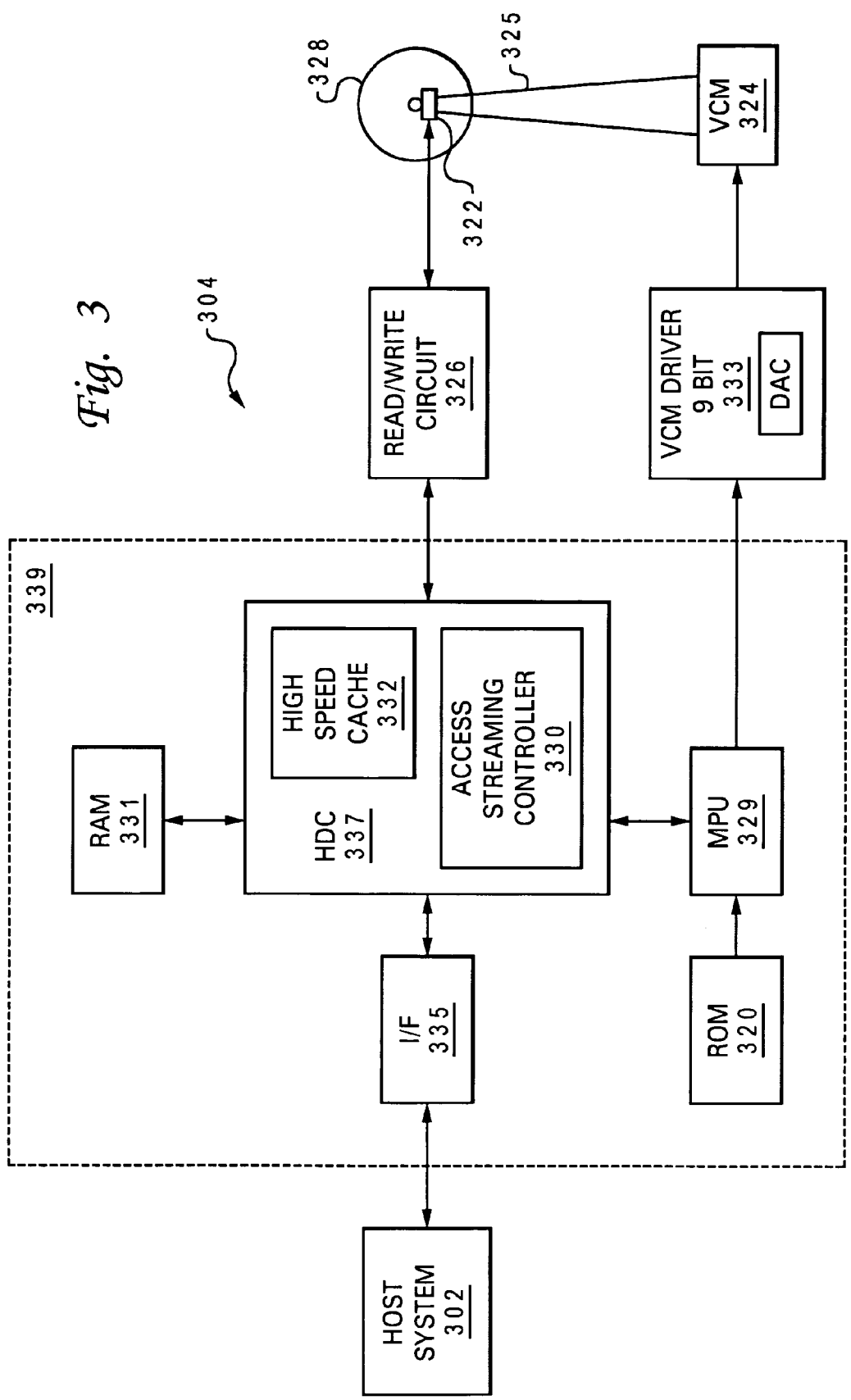
FIG. 3 is a block diagram of a preferred embodiment of a disk drive storage device incorporating the present invention.

FIG. 3 is a block diagram of a preferred embodiment of an exemplary disk drive storage device 304 incorporating the present invention. Storage device 304 has a hard magnetic disk 328 as a data record medium, and a magnetic head 322 for reading/writing data from/into the magnetic disk 328. The storage device 304 also has an actuator mechanism 325 for moving a slider which carries the magnetic head 322 to a particular position over a surface of the magnetic disk 328, a voice coil motor (VCM) 324 for causing an access arm of the actuator mechanism 325 to swing, and a VCM driver 333 that 1) controls a spindle motor for causing the magnetic disk 328 to rotate and 2) drives the VCM 324. The VCM driver 333 includes a 9-bit digital-to-analog converter (DAC), which converts a digital control signal from the MPU 329 into an analog control signal and transmits it to the VCM 324.

The storage device 304 further has a read/write circuit 326 for controlling a data read/write operation, which contains a module including an amplifier circuit for a detection signal, a waveform shaper, an analog-to-digital converter (ADC), and a digital-to-analog converter (DAC). The storage device 304 also has a hard disk controller (HDC) 337 for controlling the data read/write operation from/into the magnetic disk 328, a microprocessor unit (MPU) 329 for controlling an operation of the entire HDD inclusive of the HDC 337, a ROM 320 for storing microprograms and data to operate the MPU 329, a Random Access Memory (RAM) 331 for temporarily storing data to be read/written onto the magnetic disk 328 in response to a current read/write request, and an interface (I/F) 335 connected to host system 302 through a bidirectional line.

The HDC 337, the RAM 331 and the MPU 329 are connected to each other through a data bus (not shown). Further, the HDC 337 is connected with the MPU 329 through a control bus (not shown), and is connected with host system 302 through the I/F 335.

The magnetic disk 328 may be of an embedded servo (i.e., a sector servo) type in which a disk surface has concentric and circular tracks each containing both data regions in which data is recorded and servo regions in which servo data is previously recorded, or of a servo surface servo type in which one of the disk surfaces of the magnetic disk is for servo use only, while only data is recorded on the other disk surface.

Magnetic disk 328 has a plurality of concentric and circular data tracks, each of which includes n LBAs (logical block addresses), where n represents an arbitrary positive integer. The magnetic disk 328 is preferably formatted so as to include a first track having a predetermined number of first sequential LBAs, a second track having a predetermined number of second sequential LBAs which immediately follow the first sequential LBAs, and at least one track disposed between the first track and the second track. The HIDC 337, the RAM 331, the MIPU 329, the ROM 320 and the I/F 335 as a whole constitute a controller 339 which controls the operation of the entire disk drive storage device 304 by executing the control program (microprogram) to control read/write requests from host system 302.

HDC 337 also includes high speed cache 332 and access streaming controller 330. Access streaming controller 330 contains predictive information about records that might be required after a particular LBA or group of LBAs has been accessed. High speed cache 332 caches speculative reads that are predicted based on information stored in access streaming controller 330. More details about these predictive reads and their basis are discussed below with reference to FIGS. 4a, 4b and 5.

Although storage device 304 is depicted as a hard disk drive, it is understood that in the preferred embodiment of the present invention, storage device 304 may be any secondary storage device, including a floppy disk drive, a read/write compact disk read only memory (RW-CDROM), a Zip drive, etc.

With reference now to FIG. 4a, there is depicted a section of a track 402 of a disk surface. The depicted section contains data in LBAs A1–A8, B1–B5 and A9–A11. If a read command requests data from LBA A1–A11, the present invention determines what the likelihood is that a subsequent read command requesting data from LBA B1–B5 will be made. If this future read request for LBA B1–B5 is highly likely, and since the read head must travel across LBAs B1–B5 anyway to get from LBA A8 to LBA A9, then access streaming controller 330 directs HDC 337 to read LBA B1–B5 and store that data in high speed cache 332.

The likelihood factor that data in LBAs B1–B5 will be requested in the future is determined by information stored in access streaming controller 330, such as historical data, logical relationships, and other predictive data.

For example, historical data can tell the access streaming controller 330 if, in the past, data read requests for LBAs A1–A11 were regularly followed or preceded (either immediately or in close temporal proximity) by data read requests for LBAs B1–B5. If so, then there is a presumed likelihood that a current data read request for LBAs A1–A11 will be followed by a read request for LBAs B1–B5. The likelihood determination may be adjusted, such that a speculative read of LBAs B1–B5 is made if past reads occurred during any chosen percentage of times after an LBA A1–A11 read. That is, the speculative read of LBAs B1–B5 may be selectively made if such reads were always (100%), frequently (e.g., 80–99%), usually (e.g., 50–79%), sometimes (e.g., 20–49%) or rarely (e.g., 5–19%) made in the past after an LBA A1–A11 data read.

The choice to speculatively read data in LBAs B1–B5 may be made according to a logical relationship between data in LBAs A1–A11 and LBAs B1–B5. For example, if both sets of data are ASCII (American Standard Code for Information Interchange) characters, then there may be a determination that both sets of data are likely part of a same document, thus invoking a speculative read of data in LBAs B1–B5.

Other logical relationships may also be used to invoke such a speculative read. For example, such a logical relationship may be the physical location on a disk upon which the data are stored. Thus, if LBAs B1–B5 are near or within LBAs A1–A11, a determination may be made that there is a high likelihood that the data from LBAs B1–B5 will be subsequently requested after the request for data in LBAs A1–A11.

With reference now to FIG. 4b, LBA Ax and LBA Bx may be on different tracks as shown. That is, LBAs A1–A8 may be on inner track 404, LBAs A9–A11 may be on outer track 408, and LBAs B1–B5 may be on middle track 406. When a read request for data from LBAs A1–A11 arrives, a determination is made regarding the physical location of the read/write head and it's projected trajectory going between inner track 404 and outer track 408 (or vice versa). Since the read/write head must fly over middle track 406, if the determination is made that there is a significant likelihood that data from LBAs B1–B5 will subsequently be requested, then that data is speculatively read as described above.

A speculative read of data from LBAs B1–B5 after reading data from LBAs A1–A8 but before reading data from LBAs A9–A11 assumes that the speculative read of data from LBAs B1–B5 will not create a stall or other problems. That is, if LBAs A9–A11 must be read immediately after the read of LBAs A1–A8 because of timing or other criticality issues, then the speculative read of LBAs B1–B5, if made at all, is made after the read of LBAs A9–A11.

Figure 5:
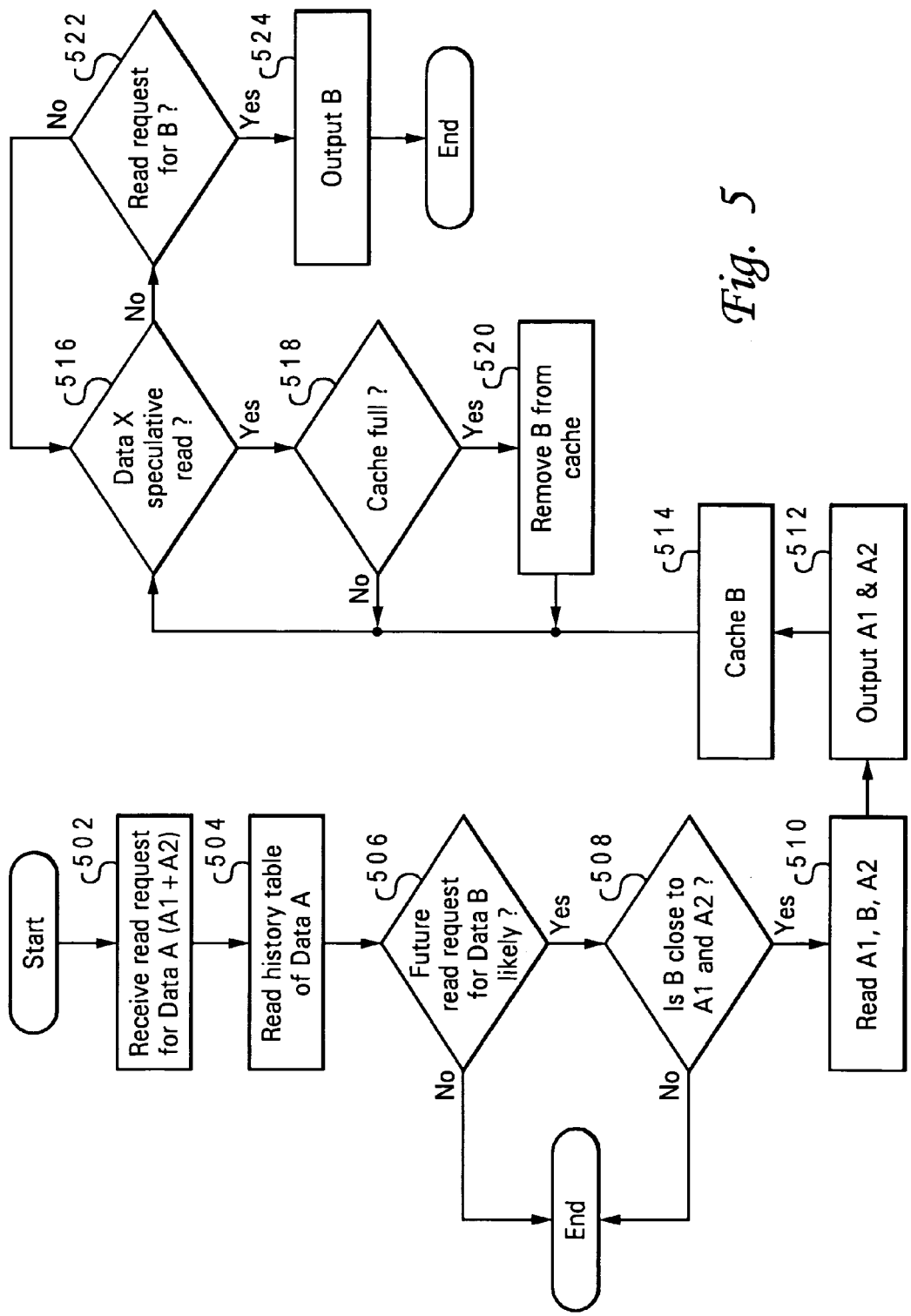
FIG. 5 is a flow-chart illustrating preferred steps used in the present invention

Referring now to FIG. 5, a flow-chart describing a preferred embodiment of the present invention is shown. Starting at block 502, a request is received at a secondary drive for Data A, which has two components, A1 and A2, stored respectively in a first set of (preferably contiguous) LBAs and a second set of (preferably contiguous) LBAs. After the request is received, but preferably before the read is performed, an analysis is performed on the LBAs where Data A is stored (block 504). Such an analysis may be a history table review (determining if other data in other LBAs is typically requested after a request for Data A), logical review, etc. as describe above.

If a determination is made that there is a likelihood that a future read of Data B will be requested (query block 506), then a determination is made (query block 508) as to whether Data B is stored in a location that is physically or logically close to Data A such that a cost (of time) to read Data B is below a pre-determined amount. For example, the determination may be made based on Data B being physically stored between sub-segments of Data A, as shown in FIGS. 4a and 4b, or if Data B is otherwise within close access to the first read segment of Data A. If Data B is close, then all of Data A and Data B is read (block 510), and Data A is output to the requesting host computer (block 512) while Data B is cached in high speed cache 332 shown in FIG. 3.

Subsequently, a determination is made as to whether other speculative reads besides those for Data B are made (query block 516). That is, a same type of analysis is made for other data on other LBAs based on the read request for Data A as was described above for Data B. Thus, a read request for Data A may result in speculative data reads for Data B as well as other Data ("Data X") and/or other distinct Data groups in different groups of LBA locations. If other speculative reads are made, they are also cached. If the subsequent speculative reads result in a potential overflow of the high speed cache (query block 518), then Data B is flushed out (block 520), assuming it was never requested.

If Data B is still in the cache and a read request for Data B is subsequently received (query block 522), then rather than read Data B from the disk, the cache outputs Data B to the requester (block 524), and the process ends.

The present invention therefore provides a novel and useful method for speculatively reading data from a disk based on the probability that 1) a second set of data will be requested after a first set of data is requested from the disk, and 2) it is time/cost efficient to read the second set of data based on the physical position of the read/write head when the first set of data, or a portion thereof, is to be read. By decreasing the access time for data stored on the disk, then stalls caused by the relatively long access time of disk data can be avoided.

While the present invention describes the physical position of the read/write head in contemplation of the first set of data and the second set of data being on a same disk, it is understood that the present invention also is useful when the first and second set of data are on different disks (platters) in a same disk drive. That is, if the first set of data are on a first platter having a first read/write head, and the second set of data are on a second platter having a second read/write head, but the read/write heads for the first and second platters are positioned such that the first and second read/write heads are contemporaneously near the respective first and second data storage locations on their respective platters, then the same algorithm (i.e., as described in query block 508 of FIG. 5) applies. Likewise, if the first and second read/write heads and their respective first and second sets of data are on opposing sides of a same disk (platter), this same algorithm applies.

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A secondary storage device capable of speculatively reading data, the secondary storage device comprising:
   reading means for reading a first datum from a storage medium;

determining means for determining a probability of the secondary storage device receiving a read request for a second datum stored on the storage medium, the second datum being logically related to the first datum, and the determining means also, if the probability is above a pre-determined probability value, determining a cost to speculatively read the second datum, the cost being based on a position of a read/write head, relative to the second datum's physical location on the fixed medium, when the read/write head is reading the first datum;

storing means for, if the cost to speculatively read the second datum is below a pre-determined cost value, reading the second datum without a request being received from outside the secondary storage device for the second datum, the storing means then storing the second datum in a secondary storage device cache; and producing means for producing the second datum from the secondary storage device cache if the secondary storage device receives a later request for the second datum.

2. The secondary storage device of claim 1, wherein the secondary storage device comprises a hard disk drive.

3. The secondary storage device of claim 2, wherein the storage medium is a magnetic disk.

4. The secondary storage device of claim 1, wherein the storage medium is an optical disk.

5. The secondary storage device of claim 1, wherein the probability of the secondary storage device receiving the request for the second datum is determined by a history of the second datum being requested when the first datum is requested.

6. The secondary storage device of claim 1, wherein the probability of the secondary storage device receiving the request for the second datum is determined by a physical proximity of the first and second data on the storage medium.

7. The secondary storage device of claim 1, wherein the cost to speculatively read the second data is determined by the first and second data being on a same track on the storage medium.

8. The secondary storage device of claim 1, wherein the probability of the secondary storage device receiving the request for the second datum is determined by the first and second datum being of a same format.

9. The secondary storage device of claim 1, wherein the first and second datum are on different disk surfaces associated with a first read/write head and a second read/write head respectively, and wherein the cost to speculatively read the second datum is determined by the second read/write head being near the physical location of the second datum when the first read/write head is near the physical location of the first datum.

10. A computer system comprising a secondary storage device capable of speculatively reading data, the computer system comprising:

a secondary storage device having reading means for reading a first datum from a storage medium;

determining means, in the secondary storage device, for determining a probability of the secondary storage device receiving a read request for a second datum stored on the storage medium, the second datum being logically related to the first datum, and the determining means also, if the probability is above a pre-determined probability value, determining a cost to speculatively read the second datum, the cost being based on a position of a read/write head, relative to the second datum's physical location on the fixed medium, when the read/write head is reading the first datum;

storing means in the secondary storage device for, if the cost to speculatively read the second datum is below a pre-determined cost value, reading the second datum without a request being received from outside the secondary storage device for the second datum, the storing means then storing the second datum in a secondary storage device cache; and producing means in the secondary storage device for producing the second datum from the secondary storage device cache if the secondary storage device receives a later request for the second datum.

11. The computer system of claim 10, wherein the secondary storage device comprises a hard disk drive.

12. The computer system of claim 11, wherein the storage medium is a magnetic disk.

13. The computer system of claim 10, wherein the storage medium is an optical disk.

14. The computer system of claim 10, wherein the probability of the secondary storage device receiving the request for the second datum is determined by a history of the second datum being requested when the first datum is requested.

15. The computer system of claim 10, wherein the probability of the secondary storage device receiving the request for the second datum is determined by a physical proximity of the first and second data on the storage medium.

16. The computer system of claim 10, wherein the cost to speculatively read the second data is determined by the first and second data being on a same track on the storage medium.

17. The computer system of claim 10, wherein the probability of the secondary storage device receiving the request for the second datum is determined by the first and second datum being of a same format.

18. The computer system of claim 10, wherein the first and second datum are on different disk surfaces associated with a first read/write head and a second read/write head respectively, and wherein the cost to speculatively read the second datum is determined by the second read/write head being near the physical location of the second datum when the first read/write head is near the physical location of the first datum.

* * * * *